United States Patent Office 3,708,567
Patented Jan. 2, 1973

3,708,567
MAKING EPOXY SPECTACLE FRAMES USING EXCESS 1 - CYCLOHEXYLAMINO - 3-AMINOPROPANE CURING AGENT
Gerald Hampel, Vienna, Austria, assignor to Optipatent AG, Zug, Switzerland
No Drawing. Continuation-in-part of applications Ser. No. 688,972, Dec. 8, 1967, and Ser. No. 885,471, Dec. 16, 1969. This application Apr. 27, 1970, Ser. No. 32,443
Claims priority, application Germany, Dec. 20, 1966, 54,422
Int. Cl. B29d 12/02; G02c 5/00
U.S. Cl. 264—331    6 Claims

ABSTRACT OF THE DISCLOSURE

A method for the manufacture of spectacle frames and components thereof having excellent flexural strength and impact strength. Polyepoxides are mixed with a greater than stoichiometric amount of 1 - cyclohexylamino-3-aminopropane to form a molding composition. An amount between 1.1 and 1.5 times the stoichiometric amount is used. Molds filled with the composition are treated at a temperature of at least about 70° C. to produce cured, hardened molded components.

---

This application is a continuation-in-part of my previous applications Ser. No. 688,972, filed Dec. 8, 1967 (which claims a priority date of Dec. 20, 1966; now abandoned, and Ser. No. 885,471, filed Dec. 16, 1969 (which claims a priority date of Dec. 18, 1968), now abandoned.

The invention concerns the manufacture of spectacle frames and component parts thereof from organic plastics.

Inexpensive spectacle frames of cellulose acetate have been mass produced by casting in molds. Such molded frames have obvious advantages over frames which are machined from larger bodies of plastic material which require additional machining operations. However, cast spectacle frames of these thermoplastic materials, such as cellulose acetate and cellulose acetate-butyrate, are undesirably prone to scratching and bending out of shape and, moreover, are heavier than desirable for comfort of the wearer.

In order to overcome these disadvantages, it is proposed to mold spectacle frames from organic duroplastic materials, such as epoxy, polyester and polyurethane resins, which are made flexible by incorporating cycloaliphatic groups as a part of the final molecular structure. The chemical binding of such flexibilizing additions in the duroplastic materials, locks in the softener and positively avoids its migration, such as often occurs when plasticizers are used. As a result, the surface luster of the molded piece withstands the passage of time.

It is found that spectacle frames and component parts of spectacle frames manufactured from epoxy resins formulated in this manner are very much lighter, harder and more resistant to scratching and bending out of shape than spectacle frames manufactured of customary thermoplastics, such as cellulose acetate. However, these are not the only characteristics of importance to spectacle frame materials. It is very important that spectacle frames also have good tensile strength, low water absorption, stability under normal temperature fluctuations while softening at a temperature in the range of about 65° C. to about 95° C. to permit manual insertion of lenses, and perhaps most importantly good flexural strength under impact. In addition, the materials should be essentially colorless and thus capable of being colored with a wide variety of dyes, while exhibiting good color stability once molded.

It has now been found that unexpectedly excellent properties for spectacle frames are obtained in epoxy resins that have been cured with 1-cyclohexylamino-3-aminopropane. It is found that the flexibility, tensile strength, hardness, resistance to aging, temperature stability and physiological compatability are excellent for spectacle frames manufactured of epoxy resins cured with this particular cycloaliphatic diamine. More importantly, the impact strength is far superior to that of other polymeric materials which might have other physical properties comparable to some of the other aforementioned properties of these epoxy resins.

As the polyepoxide intermediates, the commonly available mixtures of glycidyl ethers of Bisphenol A, which is 2,2-bis-(4-hydroxyphenyl)propane, may be used. The excellent mechanical strength values of epoxy resins made in this way by the hardening of such epoxides with 1-cyclohexylamino-3-aminopropane is believed due to the fact that the curing reaction with this particular diamine proceeds in a regular manner which can be closely controlled. Initially only the primary amino group reacts with the polyepoxide intermediates, and then the secondary amino group which is bound to the cycloalkyl group reacts to a far greater extent than the newly formed secondary amino group, with the consequent formation of long chains in the hardening resin. Only after there has been substantial consumption of the secondary amino groups originally present, do the secondary amino groups formed through reaction of the primary amino groups with epoxy groups react with sterically favorably placed epoxy groups to produce a third bond with the cycloaliphatic amine which cross links the resin. The spacial density of the cross linking locations is controlled by means of the amount of excess of the diamine curing agent, with respect to the available epoxy equivalents, which is employed.

The foregoing is diagrammatically represented as follows with reference arrows 1, 2 and 3 showing the general sequence of the attack of the epoxy groups on the amino groups of the curing agent:

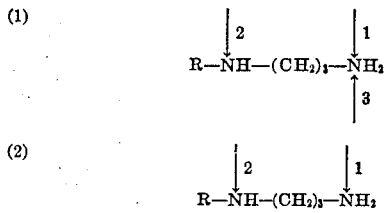

The first reaction diagram illustrates the situation when a ratio is used in the reaction mixture of one epoxy group for each hydrogen atom that is bound to a nitrogen atom (⅓ mol of diamine per epoxy equivalent). The second reaction diagram generally illustrates the situation where two epoxy groups are present relative to each three hydrogen atoms that are bound to a nitrogen atom (½ mol of diamine per epoxy equivalent), although in actuality some cross-linking would occur because some of the newly formed secondary amino groups would react before all of the epoxy group were usurped by the secondary amino groups originally available. If molar ratios between these two situations illustrated above are used, some but not all of the secondary amino groups formed by reaction of the primary amino group with an epoxy group will in turn react. Thus, selection of the ratio of hardener (1-cyclohexylamino-3-amino-propane) to polyepoxide, determines the degree of cross linking in the resultant epoxy resin in a precisely reproducible manner. Moreover, values of bending strength, impact strength and resistance to shocks which were previously considered to be unobtainable in spectacle frames can now be achieved by using this specific diamine and regulating the amount used in excess of the stoichiometric amount.

In accordance with the invention, 1-cyclohexylamino-3-aminopropane is used in an amount greater than the stoichiometric amount, which for purposes of this application is considered to be ⅓ mol of the primary-secondary diamine for each epoxy equivalent. The diamine is used in a molar amount at least about 1.1 times the stoichiometric amount and not greater than about 1.5 times the stoichiometric. Preferably, an amount of diamine between about 1.15 and about 1.45 times the stoichiometric amount is employed. Use of such amounts of diamine assures that, upon hardening of the mixture of polyepoxide and diamine, practically all of the epoxy groups are reacted. The presence of unreacted epoxy groups detracts from the physiological acceptability of the spectacle frames manufactured from polyepoxides. The presence of hardeners may also affect physiological acceptance; however, so long as the amount of diamine used is less than three times the stoichiometric amount (and more than 1.5 times is not employed), the amine always reacts with the epoxy groups at least via the primary amino group. Accordingly each diamine molecule is chemically bound in the resin, and no free amine is present that might cause some physiological unacceptability.

Commercially available mixtures of glycidyl ethers of Bisphenol A can be used as the polyepoxide intermediates in producing resins having the above-mentioned desirable properties. Such polyepoxides having epoxide equivalent weights between 170 and about 230 are suitable. Generally polyepoxides having epoxide equivalent weights between about 180 and about 200 are employed. Preferably a mixture of glycidyl ethers is used having the general formula (hereinafter referred to as Formula A):

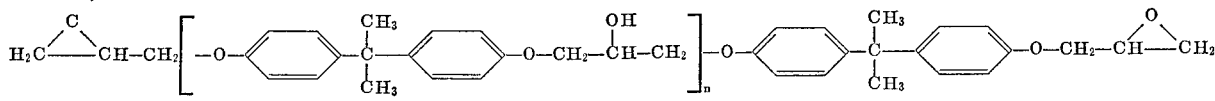

in which, molecules wherein $n=0$ are present in an amount between about 80 to 90 percent by weight, molecules wherein $n=1$ are present in an amount of 6 to 12 percent by weight and molecules wherein $n=2$ are present in an amount of 1 to 3 percent by weight. Optionally, small amounts less than about 2 percent by weight, of higher polymers may also be present, because the presence initially of long linear chains accelerates the beginning of the hardening operation.

The curing of the epoxide intermediates may be carried out at temperatures as low as about 70° C.; however, at such a temperature about a five-hour cure would be used. From a commercial standpoint, a curing temperature of at least about 90° C. would likely be used at which temperature the curing time would be at least about 2½ hours. Preferably, curing is performed at about 110° C., at which temperature the epoxy resins can be cured in about one hour. Moreover, in the molding of spectacle frames, after an initial cure of approximately twenty minutes at 110° C. has been effected, the frames, or components thereof, have sufficient shape retention to permit their removal from the molds, followed by a final, approximately forty-minute cure while the molded parts are unrestrained. Preferably curing in the mold is carried out for at least about 25 percent of the total curing time but not for more than about 50 percent of the time. Although higher temperatures may be employed to effect even more rapid curing, generally temperatures above about 120° C. are not employed because discoloration may occur, resulting in a yellowing of the epoxy resin product.

The invention is explained in greater detail by the following examples.

EXAMPLE 1

A casting composition for making spectacle frames is formulated from 100 parts by weight of a mixture of polyepoxide intermediates based on Bisphenol A and 28 parts by weight of 1-cyclohexylamino-3-amino-propane. The epoxides employed are a mixture of glycidyl ethers of Bisphenol A having aforementioned Formula A. In the mixture, the epoxides wherein $n=0$ are present in an amount of about 88 percent by weight, the epoxides wherein $n=1$ in an amount of about 10 percent by weight, and the epoxides wherein $n=2$ in an amount about 2 percent by weight. The epoxide equivalent weight of this mixture is about 190. Calculations show that, in this mixture, the epoxide and the diamine are present in stoichiometric ratio.

The mixture is cast by injecting into molds for spectacle frames after degassing to insure freedom from bubbles. The cast resin is cured in the mold for an hour at 100° C. The properties of the spectacle frames obtained are set forth in Table I hereinafter.

EXAMPLE 2

The procedure for Example 1 is repeated using 100 parts by weight of the same mixture of polyepoxides used in Example 1 and 32 parts by weight of 1-cyclohexylamino-3-aminopropane. The molar amount of amine present is about 1.15 times the stoichiometric amount. The mixture is similarly cast, and it is hardened in the mold for 45 minutes at 120° C. The mechanical properties of the spectacle frames manufactured in this way are set forth in Table I hereinafter.

Although the mixture used in Example 2 is cured at 120° C. for about 45 minutes, other comparable time/temperature equivalents may be used as indicated above. For example, curing may be carried out at one hour at 100° C. or for 2½ hours at 80° C.

EXAMPLE 3

The procedure for Example 1 is repeated using 100 parts by weight of the same mixture of polyepoxides used in Example 1 and 34.2 parts by weight of 1-cyclohexylamino-3-aminopropane. The amount of amine present is about 1.22 times the stoichiometric amount. The mixture is similarly cast, and it is hardened in the mold for one hour at 110° C. The mechanical properties of the spectacle frames manufactured in this way are also set forth in Table I hereinafter.

EXAMPLE 4

The procedure for Example 1 is repeated using 100 parts by weight of the same mixture of polyepoxides used in Example 1 and 39.2 parts by weight of 1-cyclohexylamino-3-aminopropane. The amount of amine present is about 1.4 times the stoichiometric amount. The mixture is similarly cast, and it is hardened in the mold for one hour at 110° C. The mechanical properties of the spectacle frames manufactured in this way are also set forth in Table I hereinafter.

TABLE I.—PROPERTIES OF MOLDED SPECTACLE FRAMES

| Example | 1 | 2 | 3 | 4 |
|---|---|---|---|---|
| Ratio of equivalents of epoxide to equivalents of amino hydrogen | 1:1 | 1:1.15 | 1:1.22 | 1:1.4 |
| Impact strength: kg.cm./cm.², DIN 53453 at 20° C | 34 | 70 | 91 | 70 |
| Flexural strength: kg./cm.², DIN 53452 | 1,180 | 1,130 | 1,103 | 980 |
| Tensile strength: kg./cm.², DIN 53455 at 20° C | 709 | | 752 | 720 |
| Ball impression hardness: kg./cm.², DIN 53456: | | | | |
| 10 sec | 1,125 | 1,380 | 1,320 | 1,020 |
| 60 sec | 1,109 | | 1,300 | |
| Resistance to heat, ° C. (continuous) DIN 53458 | 67 | 68 | 68 | 60 |

It can be seen from Table I that the impact strength of spectacle frames made from epoxides reacted with an over-stoichiometric amount of the cycloaliphatic diamine hardener exhibit an impact strength more than double the impact strength of those made from a stoichiometric mixture. High impact strength is considered to be the most important physical property of a good spectacle frame material although, of course, the material must also be adequate in many other physical features. Such material can absorb large impacts without breaking. This feature is important for the durability of the spectacle frames which may often fall to the ground or be subjected to impact while in the pocket of the owner. However, spectacle frames should also protect the lenses and the eyes of the wearer, and the ability of frames to absorb impact while on the face of the wearer is also extremely important from this standpoint. Whereas other hardeners for polyepoxides show only very small improvements in impact strength when reacted with polyepoxide intermediates in over-stoichiometric amounts, 1-cyclohexyl-amino-3-aminopropane shows unexpectedly large improvements in impact strength, ranging from more than double to over 2½ times the impact strength of the stoichiometric mixture.

The impact strength is a measure of both the flexibility and the flexural strength of a material. The flexibility is a measure of the distance a material can be bent before breaking, whereas flexural strength is a measure of the force needed to bend a particular material. Flexibility is important in eyeglass frames because they are necessarily subjected to flexing whenever the wearer places spectacles on his head, removes them, cleans them, etc. Sufficient flexibility is also a necessity to assure a good fit for spectacles because a very stiff material would either exert high pressure if held in contact with the temples or else fit loosely. Spectacle frames made with the specified cycloaliphatic diamine exhibit fitting characteristics reflecting good flexibility where required.

These spectacle frames also exhibit excellent dimensional stability. They have excellent shape-retention although subjected to bending during handling, and consequently they continue to exert the desired temple tension over long periods of use. In addition to being stable at the temperatures which might be encountered during everyday usage, i.e., up to about 60° C., spectacle frames made with this specific hardener exhibit softening in the temperature range of approximately 65° C. to 95° C. sufficient to permit the insertion of lenses into the frames and to permit a technician to manually bend the frames to initially establish a good fit on the head of a wearer.

The specific cycloaliphatic diamine hardener is a colorless liquid, and these spectacle frames exhibit superb clarity and color fastness. Substantially no degradation or yellowing occurs although the frames are exposed to relatively high temperatures and adverse atmospheric conditions. The water (sweat) absorbtion is extremely low, well below that of competitively available materials. The spectacle frames and components thereof made in accordance with Examples 2, 3 and 4 are considered to have outstanding properties, considerably superior to commercially available competitive spectacle frames.

Various of the features of the invention are set forth in the claims which follow.

What is claimed is:

1. A method for the manufacture of spectacle frames and components thereof by casting, which method comprises mixing polyepoxides which are glycidyl ethers of Bisphenol A with 1-cyclohexylamino-3-aminopropane in an amount from about 1.10 to about 1.5 times the stoichiometric amount, filling molds for spectacle frames or parts thereof with said mixture and hardening said mixture at a temperature of at least about 70° C.

2. A method in accordance with claim 1 wherein the cyclohexylamino-3-aminopropane is present in an amount between about 1.15 and 1.45 times the stoichiometric amount.

3. A method in accordance with claim 1 wherein said hardening is carried out for at least about 25 percent of the total curing time in the mold but not for more than about 50 percent of the total time.

4. A method in accordance with claim 1 wherein said polyepoxides have an equivalent epoxide weight between 170 and about 230.

5. A method in accordance with claim 1 wherein said glycidyl ethers of Bisphenol A are distributed in a mixture according to Formula A in which molecules wherein $n=0$ are present in an amount between about 80 to 90 percent by weight, molecules wherein $n=1$ are present in an amount between about 6 to 12 percent by weight, and molecules wherein $n=2$ are present in an amount of about 1 to 3 percent by weight.

6. A method in accordance with claim 5 wherein about 0.5 to about 2 percent by weight of said ethers are molecules wherein $n>2$.

References Cited

UNITED STATES PATENTS

| | | | |
|---|---|---|---|
| 3,393,171 | 7/1968 | Vogt et al. | 260—47 EN |
| 3,519,603 | 7/1970 | Lohse et al. | 260—47 EN |
| 3,406,232 | 10/1968 | Barker | 264—162 |
| 3,374,186 | 3/1968 | Steden et al. | 260—47 EN |
| 3,491,059 | 1/1970 | Grundsteidl | 260—47 EN |
| 3,519,602 | 7/1970 | Castro et al. | 260—47 EN |

FOREIGN PATENTS

| | | | |
|---|---|---|---|
| 1,224,910 | 9/1966 | Germany | 264—331 |
| 1,169,121 | 10/1969 | Great Britain | 264—331 |

JULIUS FROME, Primary Examiner

A. H. KOECKERT, Assistant Examiner

U.S. Cl. X.R.

260—47 EN; 351—41, 178